United States Patent
Scrofano

(10) Patent No.: US 9,369,321 B2
(45) Date of Patent: Jun. 14, 2016

(54) INCREASING SENSOR DATA CARRYING CAPABILITY OF PHASE GENERATED CARRIERS

(75) Inventor: Ronald Scrofano, Thousand Oaks, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 138 days.

(21) Appl. No.: 13/291,232

(22) Filed: Nov. 8, 2011

(65) Prior Publication Data

US 2013/0077091 A1 Mar. 28, 2013

Related U.S. Application Data

(60) Provisional application No. 61/537,675, filed on Sep. 22, 2011.

(51) Int. Cl.
| | | |
|---|---|---|
| H04B 10/00 | (2013.01) | |
| H04J 14/02 | (2006.01) | |
| H04B 10/04 | (2006.01) | |
| H04L 27/20 | (2006.01) | |
| H04L 27/22 | (2006.01) | |
| G01D 5/353 | (2006.01) | |
| H04J 11/00 | (2006.01) | |
| H04B 10/2575 | (2013.01) | |

(52) U.S. Cl.
CPC ........ H04L 27/2096 (2013.01); G01D 5/35396 (2013.01); H04L 27/223 (2013.01); H04B 10/2575 (2013.01); H04J 2011/0009 (2013.01)

(58) Field of Classification Search
CPC ................................................. G01D 5/35383
USPC .......................................... 398/203; 356/478
See application file for complete search history.

(56) References Cited

U.S. PATENT DOCUMENTS

| | | | | |
|---|---|---|---|---|
| 5,276,507 A | * | 1/1994 | Uwabata et al. | ............... 348/614 |
| 5,696,857 A | * | 12/1997 | Frederick | ........... G01D 5/35383 385/12 |
| 5,923,030 A | * | 7/1999 | Assard | ................ H04L 27/2338 250/216 |
| 5,970,053 A | * | 10/1999 | Schick | ................ H04L 27/2618 370/252 |
| 5,991,026 A | * | 11/1999 | Kluth | ................. G01D 5/35383 250/227.27 |
| 6,600,586 B1 | * | 7/2003 | Hall | .................... G01D 5/35383 398/101 |

(Continued)

FOREIGN PATENT DOCUMENTS

| | | |
|---|---|---|
| EP | 2131159 | 12/2009 |
| WO | 02/47434 | 6/2002 |
| WO | 2005/010465 | 2/2005 |

OTHER PUBLICATIONS

Grattan et al., Optical Fiber Sensor Technology, 2000, Kluwer Academic Publishers, p. 97.*

(Continued)

Primary Examiner — Ken N Vanderpuye
Assistant Examiner — Jai Lee
(74) Attorney, Agent, or Firm — Patti & Malvone Law Group, LLC

(57) ABSTRACT

An apparatus is configured to receive and demodulate a homodyne carrier signal, where the homodyne carrier signal comprises sensor data of at least two sensors. A method includes receiving sensed signals from at least two sensors; and modulating the sensed signals on a single homodyne carrier signal. A demodulator is configured to receive and demodulate a homodyne carrier signal carrying sensor data of at least two sensors.

22 Claims, 3 Drawing Sheets

(56) References Cited

U.S. PATENT DOCUMENTS

| | | | |
|---|---|---|---|
| 6,944,231 B2* | 9/2005 | Scrofano | H04L 27/2697 375/260 |
| 7,366,055 B2* | 4/2008 | Ronnekleiv | G01D 5/35383 367/64 |
| 7,526,211 B2* | 4/2009 | Mcnicol et al. | 398/204 |
| 7,622,706 B2* | 11/2009 | Maas | G01V 1/226 250/227.14 |
| 8,189,200 B2* | 5/2012 | Menezo | G01D 5/35303 356/478 |
| 8,306,431 B2* | 11/2012 | Takahara | 398/152 |
| 2003/0063679 A1* | 4/2003 | Scrofano | 375/260 |
| 2004/0208646 A1* | 10/2004 | Choudhary | H04B 10/505 398/188 |
| 2010/0171960 A1* | 7/2010 | Huang | G01B 9/02083 356/477 |
| 2010/0196016 A1* | 8/2010 | Zhang et al. | 398/152 |

OTHER PUBLICATIONS

Weik, Martin H., Fiber Optics Standard Dictionary, 1997, International Thomas Publishing, 3rd Ed., p. 431.*

Kahn et al., Coherent detection in optical fiber systems, 2008, Optical Society of America, vol. 16, No. 2, pp. 753-791.*

Durgin, G. Space-Time Wireless Channels, 2003, Pearson Education, Inc., p. 301.*

Cvijetic, M., Optical Transmission: Systems Engineering, 2004, Artech House, Inc., p. 26.*

Azarmsa, Reza, Telecommunications: A Handbook for Educators, 1993, Garland Publishing, Inc., p. 90.*

* cited by examiner

INCREASING SENSOR DATA CARRYING CAPABILITY OF PHASE GENERATED CARRIERS

This application claims priority based on U.S. Provisional Patent Application Ser. No. 61/537,675 by Ronald Scrofano, filed Sep. 22, 2011 and entitled 'Multiplying Sensor Data Carrying Capability of Phase Generated Carriers in a Frequency Division Multiplexed Fiber Optic Sensor System'.

FIELD OF THE INVENTION

This invention generally relates to communications and carriers used in communications, and more particularly to carrying multiple sensor data on a single carrier.

BACKGROUND

Fiber optic sensor systems using phase generated carriers carry information of interest in a phase of an optical signal. The "carrier" is manifested as an intentional sinusoidal phase modulation of the optical wave which is used by a sensor—essentially an interferometer—to sense some type of information (e.g., pressure). The sensed information transduced by the optical sensor adds an additional phase modulation to the optical signal. When the optical signal is received at a remote location, usually via a fiber optic means, the sensed information must be extracted from the optical signal—comprising the carrier and the sensed information—in a process commonly called demodulation. Demodulation involves first converting the amplitude of the analog optical signal to an electrical signal. In digitally oriented systems the analog electrical signal is next passed through an analog to digital converter (ADC) after which the desired sensed information can be extracted via digital means.

In a Frequency Division Multiplex (FDM) system more than one optical carrier is combined through an array of multiple sensors. As such, the electrical signal is much more complex. It is somewhat analogous to an FM cable audio system where many carriers or channels are contained on a single conductor. A technique was previously described in a homodyne system whereby a discrete Fourier transform (DFT) typically, though not necessarily, implemented as a fast Fourier transform (FFT) could be used to demodulate a number of sensors each with its own carrier. Typically, in such a system, increasing the number of sensors returned on a single fiber requires adding a new carrier for each new sensor. The computing resources required to perform demodulation in such a system, may increase dramatically as the number of sensors that are carried is increased.

SUMMARY

The invention in one implementation encompasses an apparatus. The apparatus may be configured to receive and demodulate a homodyne carrier signal, where the homodyne carrier signal comprises sensor data of at least two sensors.

Another implementation of the invention encompasses a method. The method comprising receiving sensed signals from at least two sensors, and modulating the sensed signals on a single homodyne carrier.

A further implementation of the invention encompasses a demodulator that is configured to receive and demodulate a homodyne carrier signal carrying sensed data of at least two sensors.

DESCRIPTION OF THE DRAWINGS

Features of example implementations of the invention will become apparent from the description, the claims, and the accompanying drawings in which:

DETAILED DESCRIPTION

This application contains subject matter that is related to the subject matter of the following application, which is assigned to the same assignee of this application. The teachings of the application listed below are incorporated by reference in their entirety: "DEMODULATION OF MULTIPLE-CARRIER PHASE-MODULATED SIGNALS" by Ron Scrofano U.S. Pat. No. 6,944,231 filed Sep. 6, 2001, herein after referred to as "the incorporated reference."

Figure 1:
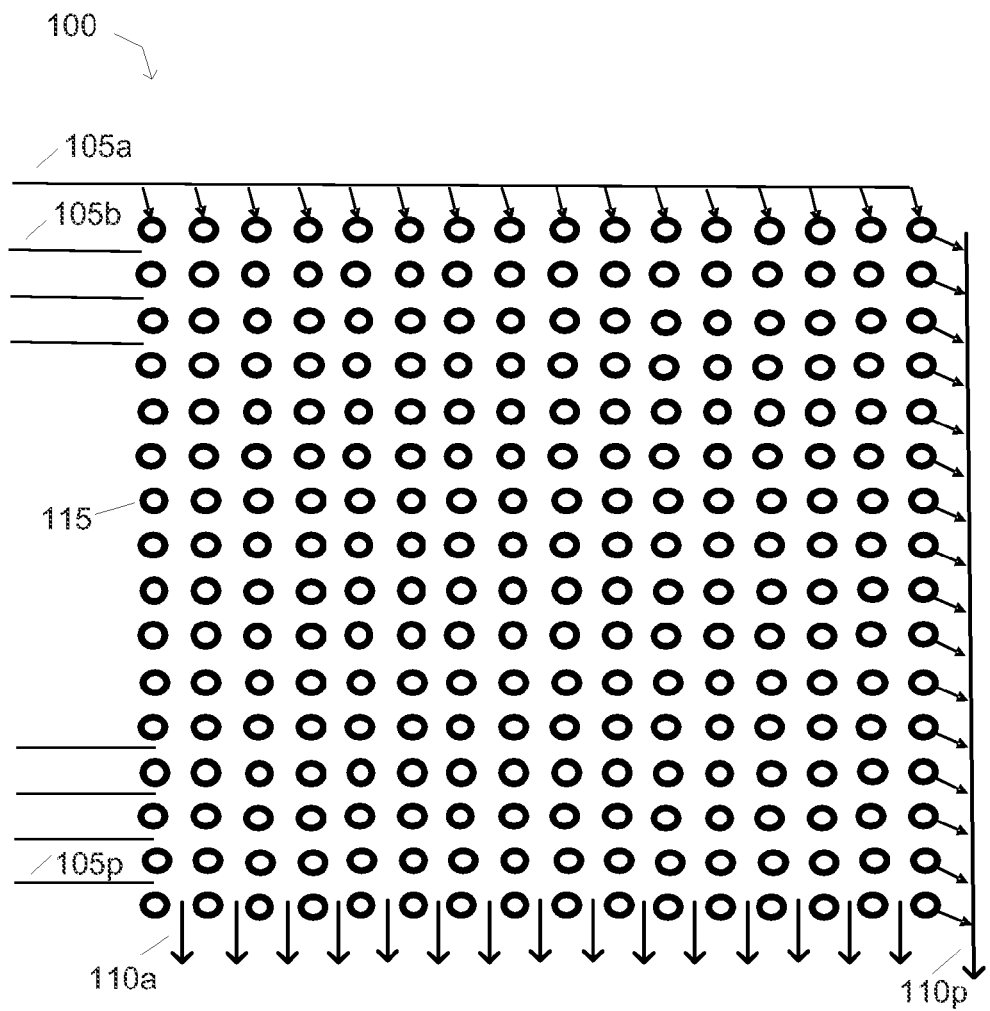
FIG. 1 is a representation of one implementation of an example of a sensor panel.

Turning to FIG. 1, which depicts a sensor panel 100, containing 256 sensors, in one example that is configured to receive a plurality of carrier signals on optical fibers 105$a$-$p$, combine the carrier signals with sensor data (i.e., sensed information), and output a signal comprising the carrier and sensor data on another optical fiber 110$a$-$p$. Although in the embodiment depicted, optical fibers are used as a medium to carry signals, in other embodiments other types of medium may be used to carry signals. A carrier signal for carrying the sensed information of a number of sensors may be sent to the panel 100 on a single fiber, and may be separated out using a demultiplexor so that the carrier signal may be used to carry sensor data for a number of sensors. For example, the carriers sent on fibers 105$a$-$p$ may be combined with or modulated with sensed information received by a sensor, for example sensor 115. The carrier comprising the modulated sensed data may be communicated on output fiber 110$a$ for transmission and demodulation.

Each input fiber 105$a$-$p$ may comprise a wavelength $\lambda$, a carrier frequency f, and a carrier phase $\theta$. Each carrier frequency may carry the sensor information for two sensors, where the carrier phase may act as a discriminant. Thus, the fiber 105$a$ may comprise carrier signal having wavelength $\lambda_1$, carrier frequency $f_1$ and carrier phase $\theta_1$. Carrier fiber 105$b$ may have carrier wavelength $\lambda_2$, carrier frequency $f_1$, and carrier phase $\theta_2$. Sensor data for two sensors may be carried using one carrier frequency with a carrier phase used as a discriminant. Accordingly, sensor data for a pair of sensors may be modulated on the same carrier frequency using the carrier phase as a discriminant. Thus, the sensed data of one sensor may be sent on a frequency, and the sensor data of a second sensor may be sent on the same frequency but with a phase offset from the first sensed data. These paired sensors may be referred to as a sensor and its paired or prime sensor. The remaining sensors may be similarly paired. Thus, the sensor data for a third and fourth sensor may be sent on wavelengths $\lambda_3$ and $\lambda_4$ using frequency $f_2$ with discriminants $\theta_1$ and $\theta_2$.

Figure 2:
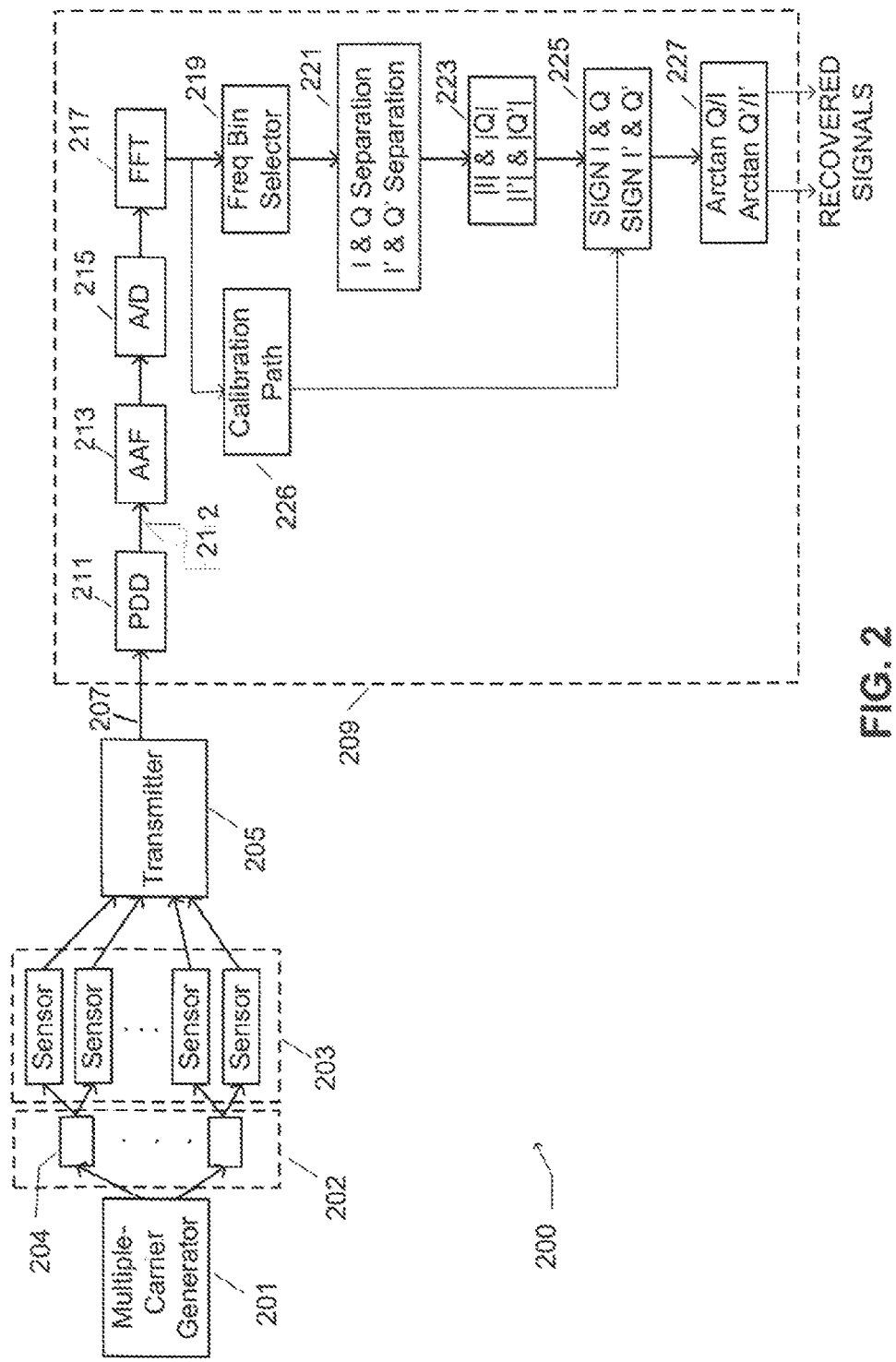
FIG. 2 is a representation of an example of a communications system for transporting multiple sensor data over a carrier.

Turning now to FIG. 2, which depicts a diagram of a communications system 200. The system 200 may be comprised of a multiple-carrier generator 201 that may generate a plurality of carriers. Each fiber emanating from the multi-carrier generator 201 may carry a plurality of carriers. In the embodiment depicted, each fiber comprises two carrier signals. A demultiplexor 204 may separate out a carrier signal destined for a sensor that may add sensed information to be demodulated by a demodulator 209. A sensor may be part of a sensor array 203. Although the sensor array depicted in FIG. 2 comprises a one dimensional array, a sensor array comprised of a multidimensional array such as the array depicted in FIG. 1 may also be used. Further, although each fiber emanating from the multiple carrier generator 201 comprises a carrier signal for two sensors, each fiber may carry carrier signals for more sensors. For example, each fiber emanating from the multiple-carrier generator may comprise carrier signals for sixteen sensors, and a wavelength division demultiplexor may be used to separate out the wavelengths of the sixteen carriers.

The sensor array 103 may be comprised of sensors, such as, for example, the sensors 115 of FIG. 1. Each of the sensors in the sensor array 203 receives or senses data that the sensor then modulates onto one of the carriers. In an embodiment, the sensors may be optical sensors that receive data and generate an optical output signal. The outputs from the sensor array 203 are input to a transmitter 205, which may combine the modulated sensor array 203 signals and couple them together for transmission through a communication medium 207, which for optical data, may be an optical medium 207 such as a fiber optic cable, air or empty space.

The multiple-carrier phase-modulated signal may be received at a demodulator 209 that demodulates the signals associated with each carrier. The results of demodulating the signal may be represented by quadrature (Q) and in-phase (I) components of a first sensor, and quadrature (Q') and in-phase (I') components of a second or paired sensor, where the second sensor is the paired sensor of the first sensor. The two sensors' datum may be modulated onto a single carrier frequency. The demodulator 209 may include a polarization diversity detector (PDD) 211 that converts an optical signal to an electrical signal, thereby generating a homodyne carrier signal 212. The demodulator 209 may also comprise an anti-aliasing filter (AAF) 213 that provides any necessary amplification or anti-aliasing functions. At least one analog-to-digital (A/D) converter 215 that converts a received signal from an analog signal to a digital signal. A fast Fourier transformer (FFT) 217 receives output from the A/D 215 converter and may perform a fast Fourier transformation on the received information. In some embodiments a fast Fourier transformer may be used, in other embodiments a discrete Fourier transform (DFT) may be used in lieu of an FFT.

A frequency bin selector 219 may receive output from the FFT 217. The frequency bin selector 219 may place the FFT 217 output data into frequency bins associated with each carrier's first harmonic and second harmonic. An I & Q separator 221 may then separate the I & Q and I' & Q' components of a sensor and its paired sensor respectively. A magnitude block 223 may determine a magnitude of the I & Q and I' & Q' components of sensed data of a sensor and its paired sensor. Hereinafter, a block may refer to a computing processor, a component of hardware, firmware, or instructions encoded on a processor. A sign block 225 may establish a sign for the I & Q and I' & Q' signal components. A calibration path 226 receives FFT 217 output and may perform various calibration functions that may be useful in a sign determination process that takes place in the sign block 225. An arctan block 227 may receive a Q/I and Q'/I' quotient and yield the desired recovered signals for a sensor and its pair.

Further details concerning the functionality of the demodulator 209 and the demodulator's 209 components are discussed below.

In a system that multiplexes multiple optical phase generated carrier signals into a single optical fiber and then transduces that signal to an electrical signal there must be a method to extract and separate those signals at the processing site. It is usual for these systems to require a unique carrier for each sensor whose information is being returned on an individual fiber or wire (wire would be used in an RF based system instead of an optical system). So, for example, if there are 8 sensors on a fiber there must be 8 unique carriers on that fiber. Thus, a critical parameter in systems with large numbers of sensors is how many fibers are needed to return all the sensor information. By doubling the number of sensors per fiber the return fiber count can be halved which is a distinct advantage in many systems. Likewise, there must be receiver processors for all the sensors. If each receiver processor could process twice the number of sensors without an increase in processing clock rate, sample rate, power consumption, space or cooling requirements that would be an advantage over the prior art. It will be shown that this improvement is very closely achievable for an embodiment of the described system and method.

The new algorithm, based on pseudo quadrature modulation of the carriers, facilitates the doubling of the sensors per carrier on a return fiber without a significant increase in the processing throughput required of the receiver processor(s), that is, the processor(s) of the demodulator 209. Equation (1) of the incorporated reference describes the optical intensity received by a system using phase generated carriers and optical sensors. The optical signal is then put through a transducer such that a voltage is generated that tracks the amplitude of the analog optical signal. As such the voltage can be written as:

$$V = A + B\cos(M\cos\omega t + \Phi(t)) \quad (1)$$

where: V=the voltage of the signal
A=the DC offset component of the voltage
B=the peak amplitude of the time varying portion of the voltage
M=the modulation depth of the phase generated carrier
ω=the modulation frequency
t=time
Φ(t)=the signal of interest to be recovered In a frequency division multiplex (FDM) system there may be more than one carrier signal present on an electrical conductor that simultaneously obeys the above equation. Therefore, generalizing equation (1) above to a multi-carrier system gives:

$$V_n = A_n + B_n \cos(M_n \cos\omega_n t + \Phi_n(t)) \quad (2)$$

where: $V_n$=the voltage of the $n^{th}$ carrier signal
$A_n$=the DC offset component of the $n^{th}$ carrier voltage
$B_n$=the peak amplitude of the time varying portion of the $n^{th}$ carrier voltage
$M_n$=the modulation depth of the $n^{th}$ phase generated carrier
$\omega_n$=the modulation frequency of the $n^{th}$ carrier
t=time
$\Phi_n(t)$=the signal of interest on the $n^{th}$ carrier to be recovered Equation (2) represents a signal that has gone through a detector (for example, the PDD 211 of FIG. 2). These may be voltages due to the n sensors. The A/D 215 of FIG. 2 may convert the analog electrical signal to a digital signal. Everything up to the recovered signal is digital. The voltage in equation (2) sums up to a single voltage that may be coming out of the fiber of the PDD 111 and into the Amplification and Anti-Aliasing Filter 213.

In equation (2) above the $\cos\omega_n t$ in the inner argument represents the modulation on the carrier signal. In heterodyning modulation a second modulation using $\sin\omega_n t$ in addition to $\cos\omega_n t$ is used in an additive way to double the information carrying capability of a carrier. This is most famously done in RF communications systems including the NTSC television system. This is what would be done in normal quadrature modulation. But because the type of modulation being discussed here is homodyne modulation the signal of interest must be recovered from both the first and second harmonics of the carrier modulation. In these systems the sensor is essentially an interferometer which creates first, second, and many higher harmonics which carry the desired information. Normal quadrature modulation will not work in these systems. An alteration of the normal quadrature modulation must be done. Recognizing the standard trigonometric identity $\sin(x)=\cos(x-\pi/2)$ which would apply in normal quadrature modulation we choose to generalize this and use $\cos(\omega_n t-\theta)$ as the modulation for the second sensor of a sensor pair. Equation (2) written for the second sensor of a pair can then be written as:

$$V'_n = A'_n + B'_n \cos(M'_n \cos(\omega_n t - \theta) + \Phi'_n(t)) \qquad (3)$$

where:
  $V'_n$=the voltage of the $n^{th}$ carrier signal—$2^{nd}$ sensor
  $A'_n$=the DC offset component of the $n^{th}$ carrier voltage—$2^{nd}$ sensor
  $B'_n$=the peak amplitude of the time varying portion of the $n^{th}$ carrier voltage—$2^{nd}$ sensor
  $M'_n$=the modulation depth of the $n^{th}$ phase generated carrier—$2^{nd}$ sensor
  $\omega_n$=the modulation frequency of the $n^{th}$ carrier
  t=time
  $\Phi_n(t)$=the signal of interest on the $n^{th}$ carrier to be recovered—$2^{nd}$ sensor
  $\theta$=the phase lag of the modulated carrier of the $2^{nd}$ sensor relative to the $1^{st}$ sensor The voltages $V'_n$ of equation (3) may be voltages due to the prime sensors. The phase shift ($\theta$) may allow us to separate the signals. I.e., separate the n' from the n signal. The total signal being processed on a single conductor is then:

$$S = \sum_{n=1}^{N} (V_n + V'_n) \qquad (4)$$

where:
  S=the combined signal of all the carriers from all paired sensors
  N=the total number of carriers
  $V_n$=the induced voltage of the $n^{th}$ carrier modulated with $\cos\omega_n t$
  $V'_n$=the induced voltage of the $n^{th}$ carrier modulated with $\cos(\omega_n t-\theta)$ From equation (4) of the incorporated reference, equation (2) above can be rewritten in an equivalent form using Bessel functions as:

$$V_n = A_n + B_n \left\{ \left[ J_0(M_n) + 2\sum_{k=1}^{\infty} (-1)^k J_{2k}(M_n)\cos 2k\omega_n t \right] \cos\Phi_n(t) - \left[ 2\sum_{k=0}^{\infty} (-1)^k J_{2k+1}(M_n)\cos(2k+1)\omega_n t \right] \sin\Phi_n(t) \right\} \qquad (5)$$

Concerning equation (5) when k of $\cos 2k\omega_n t$ is 1, this top portion of equation (5) may represent the second harmonic out of the FFT 217 of FIG. 2. On the bottom portion of equation 5 when k=0 of $\cos(2k+1)$ this portion of equation (5) may represent the first harmonic out of the FFT 217. The AAF 213 or the FFT 217 may take out the other terms. Where for the first sensor of the pair:
  $V_n$=the voltage of the $n^{th}$ carrier signal—$1^{st}$ sensor
  $A_n$=the DC offset component of the $n^{th}$ carrier voltage—$1^{st}$ sensor
  $B_n$=the peak amplitude of the time varying portion of the $n^{th}$ carrier voltage—$1^{st}$ sensor
  $M_n$=the modulation depth of the $n^{th}$ phase generated carrier—$1^{st}$ sensor
  $\omega_n$=the modulation frequency of the $n^{th}$ carrier
  t=time
  $\Phi_n(t)$=the signal of interest on the $n^{th}$ carrier to be recovered—$1^{st}$ sensor
  $J_k$=Bessel function of the first kind of the $k^{th}$ order Likewise, equation (3) above for $V'_n$ can be rewritten in an equivalent form using Bessel functions as:

$$V'_n = A'_n + B'_n \left\{ \left[ J_0(M'_n) + 2\sum_{k=1}^{\infty} (-1)^k J_{2k}(M'_n)\cos(2k(\omega_n t - \theta)) \right] \cos\Phi'_n(t) - \left[ 2\sum_{k=0}^{\infty} (-1)^k J_{2k+1}(M'_n)\cos((2k+1)(\omega_n t - \theta)) \right] \sin\Phi'_n(t) \right\} \qquad (6)$$

Where for the second sensor of the pair:
  $V'_n$=the voltage of the $n^{th}$ carrier signal—$2^{nd}$ sensor
  $A'_n$=the DC offset component of the $n^{th}$ carrier voltage—$2^{nd}$ sensor
  $B'_n$=the peak amplitude of the time varying portion of the $n^{th}$ carrier voltage—$2^{nd}$ sensor
  $M'_n$=the modulation depth of the $n^{th}$ phase generated carrier—$2^{nd}$ sensor
  $\omega_n$=the modulation frequency of the $n^{th}$ carrier
  t=time
  $\Phi'_n(t)$=the signal of interest on the $n^{th}$ carrier to be recovered—$2^{nd}$ sensor
  $J_k$=Bessel function of the first kind of the $k^{th}$ order
  $\theta$=the phase lag of the modulated carrier to the second sensor relative to the $1^{st}$ sensor From observation of equation (5) and (6) above it can be seen that if we could extract $\cos\Phi_n(t)$, $\sin\Phi_n(t)$ and $\cos\Phi'_n(t)$, $\sin\Phi'_n(t)$ we could obtain $\Phi_n(t)$ and $\Phi'_n(t)$, the two signals of interest on the same $n^{th}$ carrier. Simply putting the sine and cosine terms into an arctangent function the desired signals could then be recovered. Note, also, in order to have an even balance of power in the in phase and quadrature terms typically a value for $M_n$ may be chosen such that $J_2(M_n)$ and $J_1(M_n)$ are equal. The value used may be $M_n$=2.62987 for all n. Also, note that the $2B_n$ terms will cancel out in the arctan. In other words, any tag along terms associated with the sine and cosine of $\Phi(t)$ will cancel out in the arctan as long as they are equal. The $A_n$ and $J_0(M_n)$ terms are simply DC terms which are removed by the FFT or DFT processing, for example FFT 217. Also, as explained later the FFT 217, or in other embodiments the DFT, takes out the $\cos k\omega_n t$ terms as well. The equations for recovering the $\Phi_n(t)$ are then:

$$\Phi_n(t)=\arctan(\sin\Phi_n(t)/\cos\Phi_n(t)) \qquad (7)$$

$$\Phi'_n(t)=\arctan(\sin\Phi'_n(t)/\cos\Phi'_n(t)) \qquad (8)$$

The equations (7) and (8) may correspond to the arctan's of box 227 (FIG. 2). As equation (4) indicates the waveforms of equation (5) and (6) are simply summed on the received signal. The incorporated reference describes a technique whereby a DFT is used to separate the signals of interest on a per carrier basis including the fundamental and the higher harmonics. Typically the first harmonic of $\omega_n$ (that is $\omega_n$ itself) and its second harmonic $2\omega_n$ are used. Notice from equation (5) or (6) that the odd harmonics carry the $\sin\Phi_n(t)$ information and the even harmonics carry the $\cos\Phi_n(t)$. Thus recovering the first and second harmonics of each carrier is all that is necessary to recover the information of interest. The carriers are typically designed so that none of the higher harmonics of a lower carrier interfere with the first and second harmonics of any other carrier. In addition the analog electrical signal is band limited by a low pass filter prior to being digitized to prevent higher harmonics form aliasing back over the lower ones. This is typically called an anti-aliasing filter and is necessary in most digital signal processing systems.

Based on the FFT signal recovery, parts of equation (5) and (6) that can be isolated by the FFT are related to the original time domain parts for each carriers first and second harmonics as follows:

$$I_n = -2B_n[J_2(M_n)\cos 2\omega_n t]\cos\Phi_n(t) \text{ (from equation (5) second harmonic, } k=1) \quad (9)$$

$$Q_n = -2B_n[J_1(M_n)\cos\omega_n t]\sin\Phi_n(t) \text{ (from equation (5) first harmonic, } k=0) \text{ and:} \quad (10)$$

$$I'_n = -2B'_n[J_2(M'_n)\cos(2(\omega_n t-\theta))]\cos\Phi'_n(t) \text{ (from equation (6) second harmonic, } k=1) \quad (11)$$

$$Q'_n = -2B'_n[J_1(M'_n)\cos(\omega_n t-\theta)]\sin\Phi'_n(t) \text{ (from equation (6) first harmonic, } k=0) \quad (12)$$

Now defining some new variables for notational simplicity we have:

$$C_n = -2B_n J_2(M_n)\cos\Phi_n(t) \quad (13)$$

$$D_n = -2B_n J_1(M_n)\sin\Phi_n(t) \quad (14)$$

$$C'_n = -2B'_n J_2(M'_n)\cos\phi'_n(t) \quad (15)$$

$$D'_n = -2B'_n J_1(M'_n)\sin\phi'_n(t) \quad (16)$$

Note that equations (13) through (16) for the C and D terms now contain the sine and cosine of the $\Phi(t)$ signals. All the other parts will cancel out in the arctan function as described earlier. Equations (9), (10), (11) and (12) can now be re-written as:

$$I_n = C_n \cos 2\omega_n t \quad (17)$$

$$Q_n = D_n \cos\omega_n t \quad (18)$$

and:

$$I'_n = C'_n \cos(2(\omega_n t-\theta)) \quad (19)$$

$$Q'_n = D'_n \cos(\omega_n t-\theta) \quad (20)$$

In equations (17)-(20), the in-phase component (I) may be derived from the second harmonic of the carrier, and the quadrature phase component (Q) may be derived from the first harmonic of the carrier.

In the transform domain these four signals (17-20) would transform and show up in their respective frequency bins as complex rotating phasors as follows:

$$I_n \Rightarrow C_n e^{2j(\omega_n t+\Psi_n)} \quad (21)$$

$$Q_n \Rightarrow D_n e^{j(\omega_n t+\Psi_n)} \quad (22)$$

$$I'_n \Rightarrow C'_n e^{2j(\omega_n t-\theta+\Psi'_n)} \quad (23)$$

$$Q'_n \Rightarrow D'_n e^{j(\omega_n t-\theta+\Psi'_n)} \quad (24)$$

Formulas (21)-(24) describe what the signal may look like coming out of the FFT 217. Where, $j=\sqrt{-1}$ and the symbol $\Rightarrow$ meaning "transformed to". Also, the variables $\Psi_n$ and $\Psi'_n$ are introduced to represent the respective complex phasor angles since the epoch that the samples are taken for the FFT will not necessarily correspond to zero phase of the carrier modulation waveform. The length of the fiber from the optical modulator source to the sensor and back to the receiver will determine the apparent $\Psi_n$ and $\Psi'_n$ that the FFT sees. In addition, all carriers are designed so that there is an integer number of cycles of the carrier in the epoch of time that the samples for the FFT are taken. For example if the FFT were 512 points all the carriers will cycle an integer number of times in 512 sample times. So the $\omega_n t$ part of equations (21) through (24) can be ignored since each time the FFT is calculated and observed the phasor will be at the same angle, $\Psi_n$ for the Q term and $2\Psi_n$ for the I term. This is an essence of the algorithm as described in the incorporated reference. Basically the FFT has base banded and eliminated the carrier leaving only the information of interest. Thus equations (21) through (24) can be re-written as:

$$I_n \Rightarrow C_n e^{2j\Psi_n} \quad (25)$$

$$Q_n \Rightarrow D_n e^{j\Psi_n} \quad (26)$$

$$I'_n \Rightarrow C'_n e^{2j(\Psi'_n-\theta)} \quad (27)$$

$$Q'_n \Rightarrow D'_n e^{j(\Psi'_n-\theta)} \quad (28)$$

Because for an FFT the following identity holds true:

$$h(t)+g(t) \Rightarrow H(f)+G(f) \quad (29)$$

That is, two time domain functions when added can be represented in the transform domain by their added individual transforms. (Of course, with the FFT these are actually sampled data streams in the time domain not continuous functions but the relationship still holds.) So the transformed sums can be written as:

$$(I_n+I'_n) \Rightarrow C_n e^{2j\Psi_n}+C'_n e^{2j(\Psi'_n-\theta)} \quad (30)$$

$$(Q_n+Q'_n) \Rightarrow D_n e^{j\Psi_n}+D'_n e^{j(\Psi'_n-\theta)} \quad (31)$$

In a clocked synchronous system where the receiver analog to digital converters are synchronous with the carrier modulation system the $\Psi_n$ and $\Psi'_n$ angles will stay constant. In fact if the lengths of fibers from the modulators for the respective pairs of sensors is carefully matched the $\Psi_n$ and $\Psi'_n$ will be the same. With the receiver staying on and by turning off the modulator (or laser) for the second sensor of the pair the value of $\Psi_n$ can be deduced and averaged over a series of modulation cycles and the value recorded. This may be considered a calibration phase. Likewise, $\Psi'_n$ can be deduced by turning off the modulator (or laser) of the first sensor of the pair. (Note, that when measuring the angle to get $\Psi'_n$ the value $\theta$ should be added to the measured angle in order to get $\Psi'_n$ on the same phase basis as $\Psi_n$.) The receiver must be continuously running during this calibration process so that the sampling epoch for the receiver FFT stays the same relative to the modulation phases. Likewise the inputs to each modulator must continuously run even when the modulator is turned off to retain phase coherency when it is turned back on again. This, of course, is not difficult with modern digital techniques and digital waveform synthesis, all of which must be running off the same global clock. Although each time the receiver is started it can have an asynchronous start time relative to the modulators start time giving different $\Psi_n$ and $\Psi'_n$ after each calibration, the difference between $\Psi_n$ and $\Psi'_n$ will be the same. That is because the difference is related to the difference in the lengths of fiber provided to each sensor of the pair which normally would not be changing (except in the case of some sort of repair). Ideally this difference is zero but due to manufacturing tolerances this will not always be the case. By recording this difference, which only has to be calibrated once in the system life, it will be seen that this imperfection will calibrate out. The $\Psi_n$ and $\Psi'_n$ may have to be calibrated out each time the receiver is started if it cannot be guaranteed that the start relationship between it and the modulators is always the same. This is an implementation choice.

Normally in practice what is deduced is the sine and cosine of the $\Psi_n$ instead of the actual angle. Then with simple trigonometric identities the sine and cosine of $2\Psi_n$ can be computed. These values can then be used for computing $e^{-j\Psi_n}$ and $e^{-2j\Psi_n}$ directly from Euler's formula which states that:

$$e^{jx} = \cos(x) + j\sin(x) \text{ (Euler's formula.)} \quad (32)$$

Now we define: $\Delta\Psi_n = \Psi'_n - \Psi_n$ the transform domain we may multiply the sum of the I terms by $e^{-2j\Psi_n}$ and the sum of the Q terms by $e^{-j\Psi_n}$. Note, that in the transform domain this is just a rotation in the complex plane. The summed equations are as follows:

$$(I_n + I'_n) \Rightarrow C_n + C'_n e^{-2j(\Delta\Psi_n + \theta)} \quad (33)$$

$$(Q_n + Q'_n) \Rightarrow D_n + D'_n e^{-j(\Delta\Psi_n + \theta)} \quad (34)$$

Again using Euler's formula we expand the exponents in (33) and (34) and get:

$$(I_n + I'_n) \Rightarrow C_n + C'_n (\cos 2(\Delta\Psi_n + \theta) - j \sin 2(\Delta\Psi_n + \theta)) \quad (35)$$

$$(Q_n + Q'_n) \Rightarrow D_n + D'_n (\cos(\Delta\Psi_n + \theta) - j \sin(\Delta\Psi_n + \theta)) \quad (36)$$

Now since $\theta$ and $\Delta\Psi_n$ are known the cosine and sine terms above can be calculated and tabulated. For simplicity of notation we will assign new variables to them as follows:

$$u = \cos 2(\Delta\Psi_n + \theta) \quad (37)$$

$$v = \sin 2(\Delta\Psi_n + \theta) \quad (38)$$

$$w = \cos(\Delta\Psi_n + \theta) \quad (39)$$

$$x = \sin(\Delta\Psi_n + \theta) \quad (40)$$

Grouping the real and imaginary parts of equations (35) and (36) and re-writing we get:

$$(I_n + I'_n) \Rightarrow (C_n + uC'_n) - jvC'_n \quad (41)$$

$$(Q_n + Q'_n) \Rightarrow (D_n + wD'_n) - jxD'_n \quad (42)$$

Notice in (41) and (42) that the real terms are corrupted in that they are a sum of primed and non primed terms. However, the imaginary terms are pure (and negative). So by simply taking the imaginary terms and multiplying them by u/v in the I case and w/x in the Q case the corrupting terms can then be added out of the real term. Also, by multiplying the imaginary parts $vC'_n$ by $-1/v$ and $xD'_n$ by $-1/x$ the correct magnitudes and signs of the primed terms are restored. Thus, we have the desired isolation of $C_n$, $D_n$ and $C'_n$, $D'_n$ to the real and imaginary parts of the FFT bins for the first and second harmonics. Those signals can then proceed to the rest of the normal processing which includes the balancing of the I and Q terms and on into the arc tangent function shown in (7) and (8). Note that the other terms in the C and D variables will all cancel out in the division done for the arc tangent if the balancing is correctly done. The balancing techniques are part of prior art and are not described here.

The selection of the value for $\theta$ is important in that if chosen incorrectly the imaginary part of (41) or (42) could disappear hence the algorithm would not work. For example, assuming $\Delta\Psi_n = 0$, if 90 degrees is chosen for $\theta$ the v term will disappear which would make $C_n$ and $C'_n$ non-separable which would be useless. However, if 45 degrees is chosen the u term will equal zero and the v term will be equal one so nothing will have to be done to the I terms at all, they will automatically be in quadrature. Only the corrections will have to be applied to the Q terms. If $\Delta\Psi_n$ is not zero but is small relative to $\theta$, the algorithm will work but the corrections would have to always be applied to both the I and Q terms to get the best results. In systems which require precise accuracy this is a nice way of improving results based on $\Delta\Psi_n$ which is a calibrated quantity. This can be useful in relaxing the manufacturing tolerance requirement necessary in maintaining the input fibers to the paired sensors at the same length. The amount of cross talk between the paired sensors will be dependent on how well $\Delta\Psi_n$ is calibrated and how well $\theta$ can be maintained at the modulator. Maintaining $\theta$ should be easy since this can be controlled by digital electronics. With more averaging during the calibration process $\Delta\Psi_n$ can be improved to the desired accuracy.

So as can be seen from the above results, the same FFT that originally demodulated one sensor per carrier can now demodulate two sensors per carrier. The FFT, the most computationally intensive part of the demodulation process, is now being used to produce two results per carrier instead of one. Since the carrier frequencies would be the same as previously no change to the clock rate or the addition of extra analog front ends or detectors (which convert light to electrical) are needed. So, for example, a typical demodulator circuit card that processed eight receive fibers with eight carriers each and produced 64 sensors worth of data can now produce 128 sensors worth of data. In modern systems the digital part of such a receiver card would normally be implemented in a large capacity field programmable gate array (FPGA). The FPGA would only need a small amount of additional capacity to compute the correction equations above plus the additional arctan back end processing for the added sensors. This would typically amount to about 10 to 20 percent of the original capacity. Modern FPGA's usually come in families so a member of the family with slightly more capacity could be chosen. In many cases this would not even translate to a greater physical foot print for the chip on the receiver card.

Figure 3:
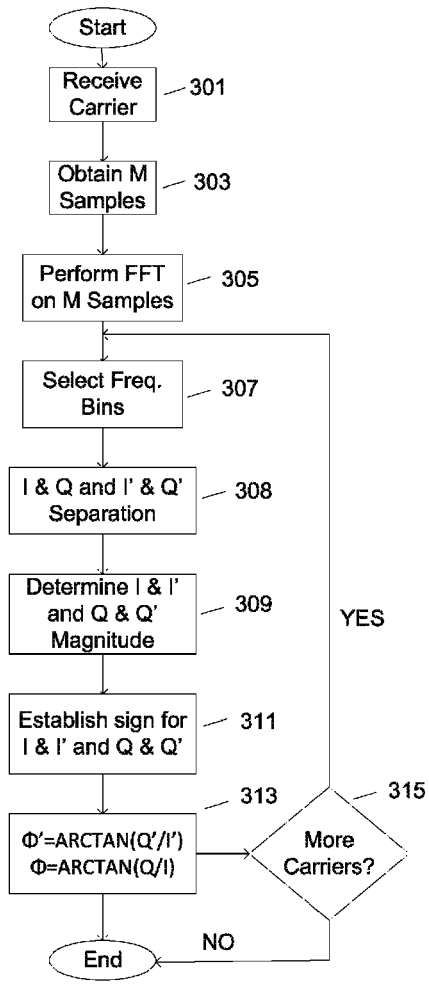
FIG. 3 is a representation of a method for transporting multiple sensor data over a carrier.

Turning now to FIG. 3, which may depict a method for demodulating a carrier signal that comprises the modulated sensor data from a sensor and its sensor pair. At 301, a carrier is received at, for example the sensor array 203. As previously described, sensed data from a pair of sensors may be modulated on a carrier and the modulated signal may be communicated to the demodulator 209 for demodulation. The demodulation process may include applying a PDD 211, amplifying the received signal, applying an anti-aliasing filter 213, and/or employing an analog-to-digital (A/D) converter 215. Digital data output from the ND converter 215 may be collected, at 303, until M samples are obtained. At 305, the FFT 217 may perform Fourier transformation on the M samples. At 307, the frequency bins for the first and second harmonics are determined. Also, as previously described, I & Q and I' & Q' components may be separated 308. A magnitude of the I & Q and I' & Q' components 309 is determined as described above. Signs for I & Q and I' and Q' are established at 311 and, as previously described, the arctangent of Q/I and Q'/I' 313 are obtained to arrive at the recovered signals for the sensor and its sensor pair. If there are more carriers to be processed, the method continues at 307.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The steps or operations described herein are just for example. There may be many variations to these steps or operations without departing from the spirit of the system 200 and method 300. For instance, the steps may be performed in a differing order, or steps may be added, deleted, or modified.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method comprising:
    generating first and second sensed signals from first and second sensors, respectively;
    coupling to the first sensor a first carrier signal having a first frequency and first phase carried on light in a first optical fiber, and coupling to the second sensor a second carrier signal having said first frequency and a second phase carried on light in a second optical fiber;
    modulating the first and second sensed signals on the first and second carrier signals, respectively, such that information represented by the first and second sensed signals are separately recoverable from the first and second carrier signals based on the first and second phases, respectively, even though the first and second carrier signals have the same frequency;
    recovery of the first and second sensor information including converting digital time domain samples of the first frequency carrier into a frequency domain having second and third frequency signals each containing components associated with the first and second phases, recovering the first and second sensor information from the second and third frequency signals, wherein only a single frequency domain conversion is required in order to recover information associated with two sensors.

2. The method of claim 1, further comprising transmitting, to a demodulator for recovery of the sensor information, the modulated first sensed signal on the first carrier signal and the modulated second sensed signal on the second carrier signal on a single light wavelength carried by an optical fiber.

3. The method of claim 1, where the sensed signals are generated from optical sensors.

4. The method of claim 1, where a voltage representing each of the sensed signals is represented by a Bessel function.

5. An demodulator for recovering information received from sensors where the demodulator receives an input signal of a first carrier frequency that contains encoded information sensed by first and second sensors, the demodulator comprising:
    a Fourier transform generator converts the first carrier frequency from a time domain to a frequency domain, the first sensor information carried by the first carrier frequency on a first carrier phase and the second sensor information carried by the first carrier frequency on a second carrier phase, the frequency domain having at least first and second harmonic representations where the first harmonic representation is one of an odd and even numbered harmonic of the first carrier frequency and the second harmonic representation is the other of an odd and even numbered harmonic of the first carrier frequency;
    a phase separator separates in-phase (I) and quadrature-phase (Q) signals for the first and second harmonic representations corresponding to the encoded information carried by the first and second carrier phase for each of the first and second sensors; and
    an arc tangent generator recovers the encoded information of the first and second sensors based on arc tangent values of respective portions of the I and Q signals of the first and second harmonic representations for the first and second sensors, whereby a single carrier frequency can be used to convey information generated by more than one sensor.

6. The demodulator of claim 5 where the arc tangent generator determines values corresponding to the encoded information of the first and second sensors based on an arc tangent of respective sine and cosine portions of the I and Q signals.

7. The demodulator of claim 5 where the Fourier transform generator comprises a digitally implemented Fourier Transform that converts the first carrier frequency from a time domain to a frequency domain, only a single Fourier Transform conversion of the first carrier frequency being needed in the recovery of the encoded information for the first and second sensors as the first and second sensor information are carried by first and second carrier phases on the same first carrier frequency.

8. The demodulator of claim 5 wherein the first carrier frequency comprises amplitude modulation on a wavelength of light carried by an optic fiber where the amplitude modulation has a frequency that defines the first carrier frequency.

9. The demodulator of claim 5 wherein the first carrier frequency arrives at the first and second sensors at different phase angles, and the first and second sensors modulate the first carrier frequency so that the encoded information from the first and second sensors are carried on the first carrier frequency with different phase angles.

10. A method for recovering information received from sensors comprising the steps of:
    receiving an input signal of a first carrier frequency that contains encoded information sensed by first and second sensors where the encoded information of the first and second sensors is carried respectively on first and second phases of the first carrier frequency;
    converting the first carrier frequency from a time domain to a frequency domain;
    separating a frequency domain of the first carrier frequency into first and second harmonic representations of the first carrier frequency where the first harmonic representation is one of an odd and even numbered harmonic of the first carrier frequency and the second harmonic representation is the other of an odd and even numbered harmonic of the first carrier frequency;
    separating in-phase (I) and quadrature-phase (Q) signals for the first and second harmonic representations corresponding to the encoded information carried by the first and second carrier phase for each of the first and second sensors; and
    recovering the encoded information of the first and second sensors based on the respective I and Q signals of the first and second harmonic representations for the first and second sensors, whereby a single carrier frequency is used to convey information generated by more than one sensor.

11. The method of claim 10 where the recovery of values corresponding to the encoded information of the first and second sensors is based on an arc tangent of respective sine and cosine portions of the I and Q functions.

12. The method of claim 10 where the converting comprises digitally implementing a Fourier Transform to convert the first carrier frequency from a time domain to a frequency domain, only a single Fourier Transform conversion of the first carrier frequency being needed in the recovery of the encoded information for the first and second sensors as the first and second sensor information are carried by first and second carrier phases on the same first carrier frequency.

13. The method of claim 10 wherein the first carrier frequency comprises amplitude modulation on a wavelength of light carried by an optic fiber where the amplitude modulation has a frequency that defines the first carrier frequency.

14. The method of claim 10 wherein the first carrier frequency arrives at the first and second sensors at different phase angles, and the first and second sensors modulate the first carrier frequency so that the encoded information from the first and second sensors are carried on the first carrier frequency with different phase angles.

15. A method for recovering information received from sensors comprising the steps of:
receiving an input signal of a first carrier frequency that contains encoded information sensed by first and second sensors where the encoded information of the first and second sensors is carried respectively on first and second phases of the first carrier frequency;
generating first and second harmonic representations of the first carrier frequency where the first harmonic representation is one of an odd and even numbered harmonic of the first carrier frequency and the second harmonic representation is the other of an odd and even numbered harmonic of the first carrier frequency;
separating in-phase (I) and quadrature-phase (Q) signals for the first and second harmonic representations corresponding to the encoded information carried by the first and second carrier phase for each of the first and second sensors; and
recovering the encoded information of the first and second sensors based on the respective I and Q signals of the first and second harmonic representations for the first and second sensors, whereby a single carrier frequency is used to convey information generated by more than one sensor.

16. The method of claim 15 where the recovery of values corresponding to the encoded information of the first and second sensors is based on an arc tangent of respective sine and cosine portions of the I and Q functions.

17. The method of claim 15 where the generating step includes digitally implementing a Fourier Transform to convert the first carrier frequency from a time domain to a frequency domain, only a single Fourier Transform conversion of the first carrier frequency being needed in the recovery of the encoded information for the first and second sensors as the first and second sensor information are carried by first and second carrier phases on the same first carrier frequency.

18. The method of claim 15 wherein the first carrier frequency comprises amplitude modulation on a single wavelength of light carried by an optic fiber where the amplitude modulation has a frequency that defines the first carrier frequency.

19. The method of claim 15 wherein the first carrier frequency arrives at the first and second sensors at different phase angles, and the first and second sensors modulate the first carrier frequency so that the encoded information from the first and second sensors are carried on the first carrier frequency with different phase angles.

20. The method of claim 10 wherein a single time domain to frequency domain transformation of the single carrier frequency is utilized to recover the sensor data from the first and second sensors.

21. The method of claim 15 wherein a single time domain to frequency domain transformation of the single carrier frequency is utilized to recover the sensor data from the first and second sensors.

22. The demodulator of claim 5 where the Fourier transform generator performs a single time domain to frequency domain transformation of the single carrier frequency to recover the sensor data from the first and second sensors.

\* \* \* \* \*